(12) United States Patent
Besehanic

(10) Patent No.: US 10,080,053 B2
(45) Date of Patent: *Sep. 18, 2018

(54) METHODS AND APPARATUS TO DETECT USER ATTENTIVENESS TO HANDHELD COMPUTING DEVICES

(71) Applicant: The Nielsen Company (US), LLC, New York, NY (US)

(72) Inventor: Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,352

(22) Filed: Sep. 14, 2016

(65) Prior Publication Data

US 2017/0006339 A1 Jan. 5, 2017

Related U.S. Application Data

(63) Continuation of application No. 14/495,323, filed on Sep. 24, 2014, now Pat. No. 9,485,534, which is a (Continued)

(51) Int. Cl.
*H04N 21/442* (2011.01)
*H04N 21/61* (2011.01)
(Continued)

(52) U.S. Cl.
CPC ...... *H04N 21/44218* (2013.01); *H04H 60/32* (2013.01); *H04N 21/4126* (2013.01);
(Continued)

(58) Field of Classification Search
CPC ......... H04N 21/44218; H04N 21/6175; H04N 21/6125; H04N 21/4126; H04H 60/32; H04H 60/33; G06Q 30/0272
See application file for complete search history.

(56) References Cited

U.S. PATENT DOCUMENTS 6,400,996 B1  6/2002 Hoffberg et al.
6,549,792 B1  4/2003 Cannon et al.
(Continued)

FOREIGN PATENT DOCUMENTS

EP  2133777     12/2009
WO  0211123     2/2002
WO  2010060146  6/2010

OTHER PUBLICATIONS

United States Patent and Trademark Office, "Notice of Allowance," issued in connection with U.S. Appl. No. 13/447,862, dated May 2, 2013, 25 pages.
(Continued)

*Primary Examiner* — Benjamin R Bruckart
*Assistant Examiner* — Tien M Nguyen
(74) *Attorney, Agent, or Firm* — Hanley, Flight & Zimmerman, LLC

(57) ABSTRACT

Methods and apparatus to detect user attentiveness to handheld computing devices are disclosed. An example handheld computing device includes a detector to detect at least one of an orientation change of the handheld computing device or a distance change between the handheld computing device and a user, and a comparator to determine user attentiveness to a presentation on the handheld computing device based on the at least one of the orientation change of the handheld computing device or the distance change between the handheld computing device and the user.

20 Claims, 5 Drawing Sheets

Related U.S. Application Data continuation of application No. 13/893,027, filed on May 13, 2013, now Pat. No. 8,869,183, which is a continuation of application No. 13/447,862, filed on Apr. 16, 2012, now Pat. No. 8,473,975.

(51) Int. Cl.
  *H04N 21/41* (2011.01)
  *H04H 60/32* (2008.01)
  *G06Q 30/02* (2012.01)
  *H04H 60/33* (2008.01)

(52) U.S. Cl.
  CPC ..... *H04N 21/6125* (2013.01); *H04N 21/6175* (2013.01); *G06Q 30/0272* (2013.01); *H04H 60/33* (2013.01)

(56) References Cited

U.S. PATENT DOCUMENTS

| | | |
|---|---|---|
| 6,783,459 B2 | 8/2004 | Cumbers |
| 6,834,249 B2 | 12/2004 | Orchard |
| 6,839,072 B2 | 1/2005 | Trajkovic et al. |
| 6,850,252 B1 | 2/2005 | Hoffberg |
| 7,224,996 B2 | 5/2007 | Sakamoto |
| 7,236,156 B2 | 6/2007 | Liberty et al. |
| 7,373,820 B1 | 5/2008 | James |
| 7,430,439 B2 | 9/2008 | Griffin et al. |
| 7,479,949 B2 | 1/2009 | Jobs et al. |
| 7,499,232 B2 | 3/2009 | Hodge et al. |
| 7,505,921 B1 | 3/2009 | Lukas et al. |
| 7,697,962 B2 | 4/2010 | Cradick et al. |
| 7,716,054 B2 | 5/2010 | Harris et al. |
| 7,733,224 B2 | 6/2010 | Tran |
| 7,859,521 B2 | 12/2010 | Hotelling et al. |
| 8,049,756 B2 | 11/2011 | Shuster |
| 8,085,125 B2 | 12/2011 | Bigdely Shamlo |
| 8,292,433 B2 | 10/2012 | Vertegaal |
| 8,432,366 B2 | 4/2013 | Hodges et al. |
| 8,473,975 B1 | 6/2013 | Besehanic |
| 8,869,183 B2 | 10/2014 | Besehanic |
| 9,485,534 B2 | 11/2016 | Besehanic |
| 2003/0179229 A1 | 9/2003 | Van Erlach et al. |
| 2004/0203850 A1 | 10/2004 | Oesterling |
| 2004/0239639 A1 | 12/2004 | Stavely et al. |
| 2005/0212755 A1 | 9/2005 | Marvit |
| 2006/0238161 A1 | 10/2006 | Rusnell et al. |
| 2006/0247915 A1 | 11/2006 | Bradford et al. |
| 2007/0075127 A1* | 4/2007 | Rosenberg ............ G06F 1/3203 235/375 |
| 2007/0180469 A1 | 8/2007 | Finley et al. |
| 2007/0203850 A1 | 8/2007 | Singh et al. |
| 2007/0271518 A1 | 11/2007 | Tischer et al. |
| 2007/0271580 A1 | 11/2007 | Tischer et al. |
| 2007/0294705 A1 | 12/2007 | Gopalakrishnan et al. |
| 2008/0086533 A1 | 4/2008 | Neuhauser et al. |
| 2008/0091451 A1 | 4/2008 | Crystal |
| 2008/0091762 A1 | 4/2008 | Neuhauser et al. |
| 2008/0109295 A1 | 5/2008 | McConochie et al. |
| 2008/0214160 A1 | 9/2008 | Jonsson |
| 2008/0249867 A1 | 10/2008 | Angell et al. |
| 2009/0012927 A1 | 1/2009 | Brooks et al. |
| 2009/0083129 A1 | 3/2009 | Pradeep et al. |
| 2009/0085877 A1 | 4/2009 | Chang et al. |
| 2009/0088204 A1 | 4/2009 | Culbert et al. |
| 2009/0097689 A1 | 4/2009 | Prest et al. |
| 2009/0099983 A1 | 4/2009 | Drane et al. |
| 2009/0128567 A1 | 5/2009 | Shuster et al. |
| 2009/0193052 A1 | 7/2009 | Fitzgerald et al. |
| 2009/0307633 A1 | 12/2009 | Haughay, Jr. et al. |
| 2009/0320123 A1 | 12/2009 | Yu et al. |
| 2010/0134655 A1 | 6/2010 | Kuroiwa |
| 2010/0211439 A1 | 8/2010 | Marci et al. |
| 2010/0225443 A1 | 9/2010 | Bayram et al. |
| 2010/0249538 A1 | 9/2010 | Pradeep et al. |
| 2010/0265204 A1 | 10/2010 | Tsuda |
| 2010/0279738 A1 | 11/2010 | Kim et al. |
| 2011/0004474 A1 | 1/2011 | Bansal et al. |
| 2011/0054830 A1 | 3/2011 | Logan |
| 2011/0066383 A1 | 3/2011 | Jangle et al. |
| 2011/0077891 A1 | 3/2011 | Koenig |
| 2011/0156867 A1 | 6/2011 | Carrizo et al. |
| 2011/0181422 A1 | 7/2011 | Tran |
| 2011/0279228 A1 | 11/2011 | Kumar |
| 2011/0279453 A1 | 11/2011 | Murphy et al. |
| 2012/0032806 A1 | 2/2012 | Lee |
| 2012/0032819 A1 | 2/2012 | Chae et al. |
| 2012/0033594 A1 | 2/2012 | Kalbag |
| 2012/0081392 A1 | 4/2012 | Arthur |
| 2012/0083668 A1 | 4/2012 | Pradeep et al. |
| 2012/0158520 A1* | 6/2012 | Momeyer .......... G06Q 30/0273 705/14.69 |
| 2012/0200391 A1 | 8/2012 | Sugiyama et al. |
| 2012/0278377 A1 | 11/2012 | Weissman et al. |
| 2012/0284332 A1 | 11/2012 | Pradeep et al. |
| 2012/0306758 A1 | 12/2012 | Marsden et al. |
| 2013/0102283 A1 | 4/2013 | Lau et al. |
| 2013/0135218 A1 | 5/2013 | Jain et al. |
| 2013/0205360 A1 | 8/2013 | Novak et al. |
| 2013/0222277 A1 | 8/2013 | O'Hara |
| 2013/0232142 A1 | 9/2013 | Nielsen et al. |
| 2014/0244566 A1 | 8/2014 | Hewett et al. |
| 2015/0012927 A1 | 1/2015 | Besehanic |

OTHER PUBLICATIONS

United States Patent and Trademark Office, "Notice of Allowance," issued in connection with U.S. Appl. No. 13/893,027, dated Jun. 13, 2014, 19 pages.

United States Patent and Trademark Office, "Non-Final Office Action", issued in connection with U.S. Appl. No. 13/307,599, dated Jun. 19, 2015, 27 pages.

United States Patent and Trademark Office, "Final Office Action," issued in connection with U.S. Appl. No. 13/307,599, dated Feb. 23, 2015, 24 pages.

United States Patent and Trademark Office, "Notice of Allowance" issued in connection with U.S. Appl. No. 13/781,236, dated Sep. 29, 2015, 5 pages.

United States Patent and Trademark Office, "Office Action," issued in connection with U.S. Appl. No. 13/781,236, dated Nov. 18, 2014, 8 pages.

United States Patent and Trademark Office, "Advisory Action," issued in connection with U.S. Appl. No. 13/781,236, dated Aug. 4, 2015, 3 pages.

United States Patent and Trademark Office, "Final Office Action," issued in connection with U.S. Appl. No. 13/781,236, dated May 14, 2015, 10 pages.

International Searching Authority, "International Search Report and Written Opinion," issued in connection with International Application No. PCT/US12/67049, dated Mar. 25, 2013, 10 pages.

United States Patent and Trademark Office, "Non-Final Office Action," issued in connection with U.S. Appl. No. 13/473,361, dated Mar. 31, 2014, 10 pages.

United States Patent and Trademark Office, "Non-Final Office Action," issued in connection with U.S. Appl. No. 13/473,361, dated Feb. 12, 2015, 23 pages.

United States Patent and Trademark Office, "Advisory Action," issued in connection with U.S. Appl. No. 13/473,361, dated Nov. 10, 2014, 4 pages.

United States Patent and Trademark Office, "Final Office Action," issued in connection with U.S. Appl. No. 13/473,361, dated Aug. 14, 2014, 17 pages.

United States Patent and Trademark Office, "Non-Final Office Action," issued in connection with U.S. Appl. No. 13/307,599, dated Jul. 30, 2014, 18 pages.

United States Patent and Trademark Office, Final Office Action issued in connection with U.S. Appl. No. 13/307,599, dated May 3, 2016, 29 pages.

(56) References Cited

OTHER PUBLICATIONS

United States Patent and Trademark Office, "Non-Final Office Action," issued in connection with U.S. Appl. No. 13/409,796, dated Jul. 17, 2013, 19 pages.
United States Patent and Trademark Office, "Final Office Action," issued in connection with U.S. Appl. No. 13/409,796, dated Mar. 14, 2014, 20 pages.
United States Patent and Trademark Office, "Non-Final Office Action," issued in connection with U.S. Appl. No. 13/409,796, dated Aug. 19, 2014, 23 pages.
United States Patent and Trademark Office, "Non-Final Office Action," issued in connection with U.S. Appl. No. 13/409,796, dated Apr. 27, 2015, 24 pages.
United States Patent and Trademark Office, "Non-Final Office Action," issued in connection with U.S. Appl. No. 13/409,796, dated Sep. 9, 2015, 23 pages.
United States Patent and Trademark Office, "Final Office Action," issued in connection with U.S. Appl. No. 13/409,796, dated Apr. 6, 2016, 22 pages.
United States Patent and Trademark Office, "Notice of Allowance," issued in connection with U.S. Appl. No. 13/409,796, dated Aug. 10, 2016, 20 pages.
United States Patent and Trademark Office, "Non-Final Office Action," issued in connection with U.S. Appl. No. 14/495,323, dated Oct. 7, 2015, 13 pages.
United States Patent and Trademark Office, "Final Office Action," issued in connection with U.S. Appl. No. 14/495,323, dated Feb. 3, 2016, 10 pages.
United States Patent and Trademark Office, "Notice of Allowance," issued in connection with U.S. Appl. No. 14/495,323, dated Apr. 26, 2016, 17 pages.
United States Patent and Trademark Office, "Supplemental Notice of Allowability," issued in connection with U.S. Appl. No. 14/495,323, dated May 12, 2016, 13 pages.
European Patent Office, "Communication Pursuant to Article 94(3) EPC," issued in connection with European Patent Application No. 03027280.1, dated Apr. 1, 2010, 2 pages.
European Patent Office, "European Search Report," issued in connection with European Patent Application No. 03027280.1, dated Apr. 6, 2005, 3 pages.
United States Patent and Trademark Office, "Notice of Allowability," issued in connection with U.S. Appl. No. 14/495,323, dated Sep. 19, 2016, 15 pages.

\* cited by examiner

METHODS AND APPARATUS TO DETECT USER ATTENTIVENESS TO HANDHELD COMPUTING DEVICES

RELATED APPLICATION

This patent arises from a continuation of U.S. patent application Ser. No. 14/495,323, filed Sep. 24, 2014, now U.S. Pat. No. 9,485,534, which is a continuation of U.S. patent application Ser. No. 13/893,027, filed May 13, 2013, now U.S. Pat. No. 8,869,183, which is a continuation U.S. patent application Ser. No. 13/447,862, filed Apr. 16, 2012, now U.S. Pat. No. 8,473,975. U.S. patent application Ser. No. 14/495,323, U.S. patent application Ser. No. 13/893,027 and U.S. patent application Ser. No. 13/447,862 are hereby incorporated herein by reference in their entireties.

FIELD OF THE DISCLOSURE

This disclosure relates generally to audience measurement and, more particularly, to methods and apparatus to detect user attentiveness to handheld computing devices.

BACKGROUND

Audience measurement of media (e.g., content or advertisements) delivered in any format (e.g., via terrestrial, cable, or satellite television and/or radio, stored audio and/or video played back from a memory such as a digital video recorder or an optical disc, a webpage, audio and/or video presented (e.g., streamed) via the Internet, video games, etc.) often involves collection of media identifying data (e.g., signature(s), fingerprint(s), code(s), tuned channel identification information, time of exposure information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

DETAILED DESCRIPTION

Figure 1:
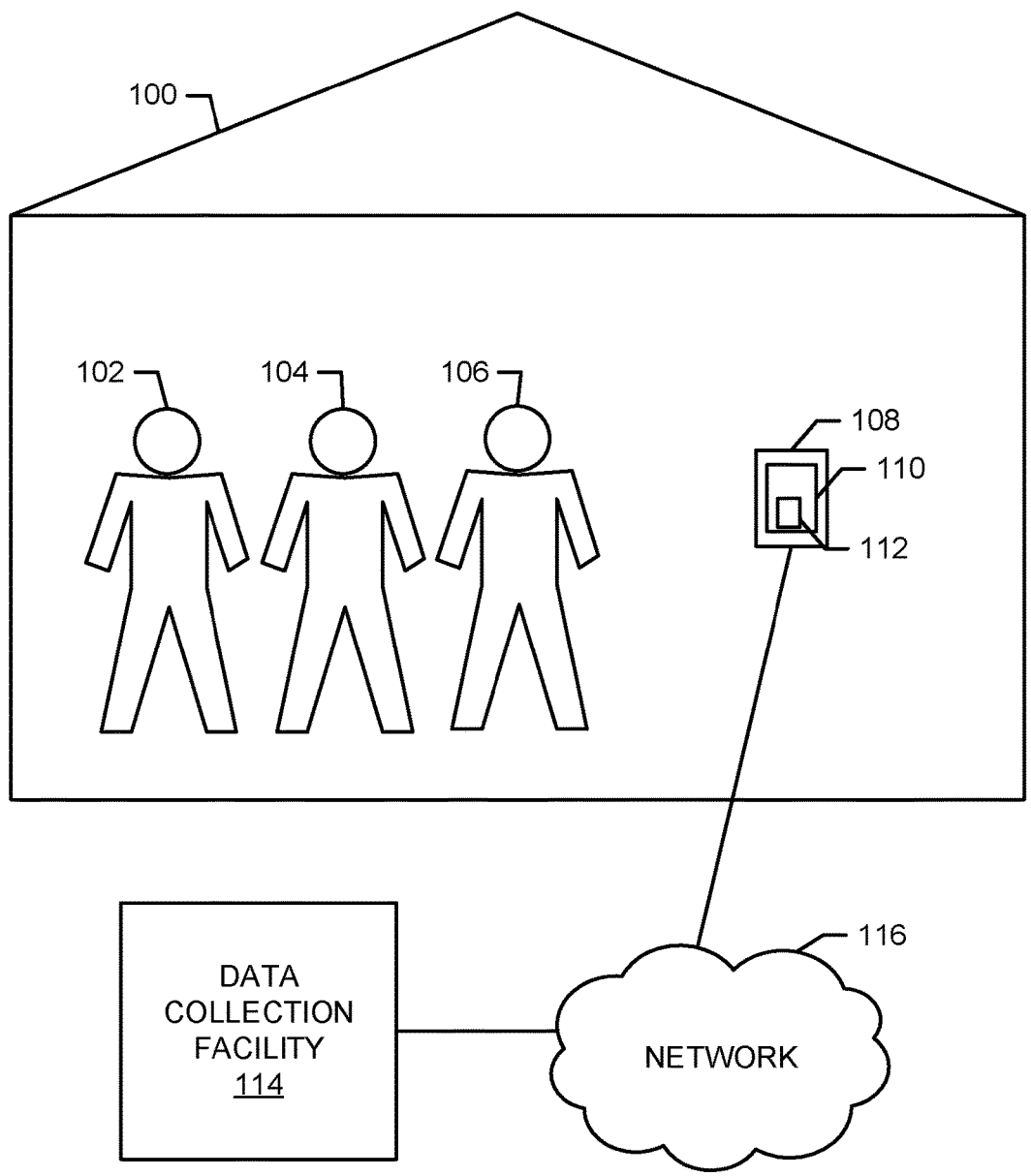
FIG. 1 is an illustration of an example handheld computing device including an example exposure measurement application constructed in accordance with the teachings of this disclosure.

In some audience measurement systems, exposure data is collected in connection with usage of one or more computing devices. For example, audience measurement systems often employ one or more techniques to determine user exposure to media via browsing the Internet via computing devices. The exposure data can be correlated with the identities and/or demographics of users to, for example, generate statistics for the detected media. For example, an audience measurement entity (e.g., Nielsen®) can calculate ratings and/or other statistics (e.g., online exposure statistics, such as a number of impressions for a web address that hosts an advertisement) for a piece of media (e.g., an advertisement, a website, a movie, a song, an album, a news segment, personal video (e.g., a YouTube® video), a highlight reel, a television program, a radio program, etc.) accessed via a computing device by crediting the piece of media as being presented on the computing device at a first time and identifying the audience member(s) using the computing device at the first time. Some known systems credit exposure to the media and generate statistics based on such crediting irrespective of the fact that the user(s) may be paying little or no attention to the presentation of the media.

Examples disclosed herein recognize that although media may be presented on a computing device, a current user may or may not be paying attention to (e.g., be engaged with) the presentation of the media. For example, when viewing online media (e.g., via a service such as Hulu®) on a handheld computing device (e.g., an iPad® or iPhone®), users are often presented with advertisements at one or more points or segments in the presented programming. The user is typically unable to fast-forward or skip the advertisement. However, the user can easily disengage from (e.g., stop paying attention to) the handheld computing device during presentation of the advertisement by, for example, putting the handheld computing device down or turning the handheld computing device away from view. In such instances, while the user did not actually pay attention to the advertisement, a known prior monitoring service measuring exposure to the advertisement would credit the advertisement as being watched by the user even though the user did not watch the advertisement.

Example methods, apparatus, and articles of manufacture disclosed herein measure attentiveness of users of handheld computing devices with respect to one or more pieces of media presented on the handheld computing devices. A first example measure of attentiveness for a user provided by examples disclosed herein is referred to herein as engagement likelihood. As used herein, an engagement likelihood associated with a presented piece of media refers to a value representative of a confidence that the user is paying or has begun paying attention to a presentation on a handheld computing device. A second example measure of attentiveness for a user provided by examples disclosed herein is referred to herein as disengagement likelihood. As used herein, a disengagement likelihood associated with a presented piece of media refers to a value representative of a confidence that the user is not paying (or has ceased paying) attention to a presentation of the handheld computing device.

As used herein, the term "handheld computing device" refers to any form of processor based device that can be, and is intended to be simultaneously held in the air and operated by one or more hands of a user. In other words, as used herein, a handheld computing device is readily moved and held by the hand(s) of a user and is designed to receive input from the user while being held in the air by the hand(s) of the user. While a handheld computing device can remain stationary during user operation, a handheld computing device is not one designed or mainly meant to remain stationary during interaction with a user, such as a desktop computer. For example, a handheld computing device such as a tablet or smart phone can be placed on a table and operate by a user while resting on the table. However, unlike non-handheld computing devices such as desktop computers, the tablet can also be picked up and operating by the user with one or both hands.

To determine a likelihood that a user is paying attention to (e.g., engaged with) or not paying attention to (e.g., disengaged with) a handheld computing device that is presenting media, examples disclosed herein utilize sensors of the handheld computing device (e.g., gravitational sensors (e.g., accelerometers, gyroscopes, tilt sensors), microphones, magnetometers, global positioning sensors, etc.) to detect one or more spatial (e.g., position, movement and/or orientation) conditions related to the handheld computing device while, for example, the media is being presented. Example spatial conditions detected by the sensor(s) of the handheld computing device include an angular orientation or tilt relative to one or more reference lines (e.g., a horizontal reference line, a vertical reference line, etc.), a distance from a nearest object (e.g., a user), a proximity to a person, etc. Examples disclosed herein also detect changes to current spatial conditions, such a change from a first orientation to a second orientation and/or a change from a first position relative to a user to a second position relative to the user. Examples disclosed herein compare detected change(s) to an index of likelihoods, each likelihood corresponding to a respective one of a plurality of possible changes (e.g., a first position to a second position). In other words, the likelihoods of the index provided by examples disclosed herein are indicative of how likely a user is engaged or disengaged with a presentation on the handheld computing device when the user changes the handheld computing device from a first spatial condition to a second spatial condition. For example, a first example engagement likelihood of the example index disclosed herein indicates that the user is likely (e.g., according to a corresponding percentage) to be paying attention to a screen of the handheld computing device and/or likely beginning to pay attention to the screen of the handheld computing device when the user changes the orientation of the handheld computing device from parallel to the ground (e.g., resting on a table) to a forty-five degree angle relative to a horizontal reference that is facing downward and parallel to the ground (e.g., being held above the user while the user is laying down). Conversely, a first example disengagement likelihood of the example index disclosed herein indicates that the user is unlikely to be paying attention to the screen of the handheld computing device and/or likely to begin disengaging from the screen of the handheld computing device when the user changes the orientation of the handheld computing device from a forty-five degree angle relative to the horizontal reference that is parallel to the ground to a position that is parallel to the ground.

A second example disengagement likelihood of the example index disclosed herein indicates that the user is unlikely to be paying attention to the screen of the handheld computing device and/or likely to begin disengaging from the screen of the handheld computing device when the user changes a position of the handheld computing device relative to the user from a first position proximate the user to a second position in which the user is undetected (e.g., the device is too far away from the user for the sensors of the handheld computing device to determine a distance between the handheld computing device and the user). Conversely, a second example engagement likelihood of the example index disclosed herein indicates that the user is likely to be paying attention to the screen of the handheld computing device and/or beginning to pay attention to the screen of the handheld computing device when the user changes a position of the handheld computing device relative to the user from the second position (e.g., an undetectable distance from the user) to the first position (e.g., proximate the user).

Other example engagement and disengagement likelihoods of the example index disclosed herein correspond to changes in orientation combined with changes in relative position. In other words, some example engagement likelihoods of the example index disclosed herein indicate how likely it is that the user is paying attention to or is beginning to pay attention to the presentation on the handheld computing device when a certain change in orientation coincides with a certain change in relative position (e.g., a change in distance between the device and the user). Additionally or alternatively, some example disengagement likelihoods of the example index disclosed herein indicate how likely it is that the user is not paying attention to or is beginning to disengage from the presentation on the handheld computing device when a certain change in orientation coincides with a certain change in relative position (e.g., a change in distance between the device and the user).

Using the example index disclosed herein, user attentiveness to handheld computing devices can be passively collected. As a user interacts with a handheld computing device, examples disclosed herein detect change(s) in orientation and/or relative position (e.g., of the device with respect to the user) and compare the detected change(s) to the engagement/disengagement likelihood index. If the detected change(s) correspond to (e.g., within a threshold) one or more of the changes of the engagement/disengagement likelihood index, examples disclosed herein determine that the corresponding likelihood represents how likely it is that the current user is paying attention to the handheld computing device, beginning to pay attention to the handheld computing device, not paying attention to the handheld computing device, and/or beginning to disengage from the handheld computing device. The attentiveness measurements provided by examples disclosed herein can be used to, for example, increase granularity and accuracy of exposure measurement data generated in connection with the media being presented on the handheld computing device.

FIG. 1 is an illustration of an example household 100 including a plurality of household members 102, 104, and 106. The example household 100 of FIG. 1 (e.g., a "Nielsen family") has been statistically selected by, for example, an audience measurement entity (e.g., The Nielsen Company®) for the purpose of developing statistics (e.g., ratings) for a population/demographic of interest. One or more persons of the household 100 of the illustrated example have registered with the audience measurement entity (e.g., by agreeing to be a panelist) and have provided their demographic information as part of the registration. In the illustrated example of FIG. 1, the provided demographic information includes identification information (e.g., user names, identifiers, etc.), age, gender, income level, etc. for each of the household members 102-106. One or more of the household members 102-106 has access to a handheld computing device 108 having a user interface 110. The example handheld computing device 108 of FIG. 1 is a tablet (e.g., an iPad®). However, the example handheld computing device 108 can be any other type of handheld computing device, such as a smart phone (e.g., an iPhone®).

The example handheld device 108 of FIG. 1 includes an exposure measurement application 112 configured in accordance with teachings of this disclosure. As described in greater detail below in connection with FIGS. 2-4, the example exposure measurement application 112 calculates information related to attentiveness of users of the handheld computing device 108 and detects media (e.g., an advertisement, a website, a movie, a song, an album, a news segment, personal video (e.g., a YouTube® video), a highlight reel, a television program, a radio program, etc.) presented on the handheld computing device 108. In the example of FIG. 1, the exposure measurement application 112 communicates attentiveness information and/or media identification information to a data collection facility 114 via a network 116 (e.g., a local-area network, a wide-area network, a metropolitan-area network, the Internet, a digital subscriber line (DSL) network, a cable network, a power line network, a wireless communication network, a wireless mobile phone network, and/or a Wi-Fi network). In the illustrated example, the data collection facility 114 is managed by an audience measurement entity that provides the example exposure measurement application 112 to the household 100. For example, the audience measurement entity associated with the data collection facility 114 makes the exposure measurement application 112 available for download onto the example handheld computing 108 over the network 116 and/or via any other suitable communication media (e.g., email, a disk, etc.). In some examples, several versions of the exposure measurement application 112 are made available, each version being tailored to a specific operating system and/or type or model of handheld computing device. Additionally, each of the versions of the exposure measurement application 112 may be made available on a download service (e.g., Apple® App Store®) associated with the corresponding operating system and/or type or model of handheld computing device. Any suitable manner of installing the exposure measurement application 112 onto the example handheld computing device 108 may be employed. While the example exposure measurement application 112 is described herein in connection with the household 100 of panelists, the example exposure measurement application 112 disclosed herein can be installed and executed on handheld computing devices associated with individual panelists and/or handheld computing devices associated with non-panelists (e.g., the general public).

Figure 2:
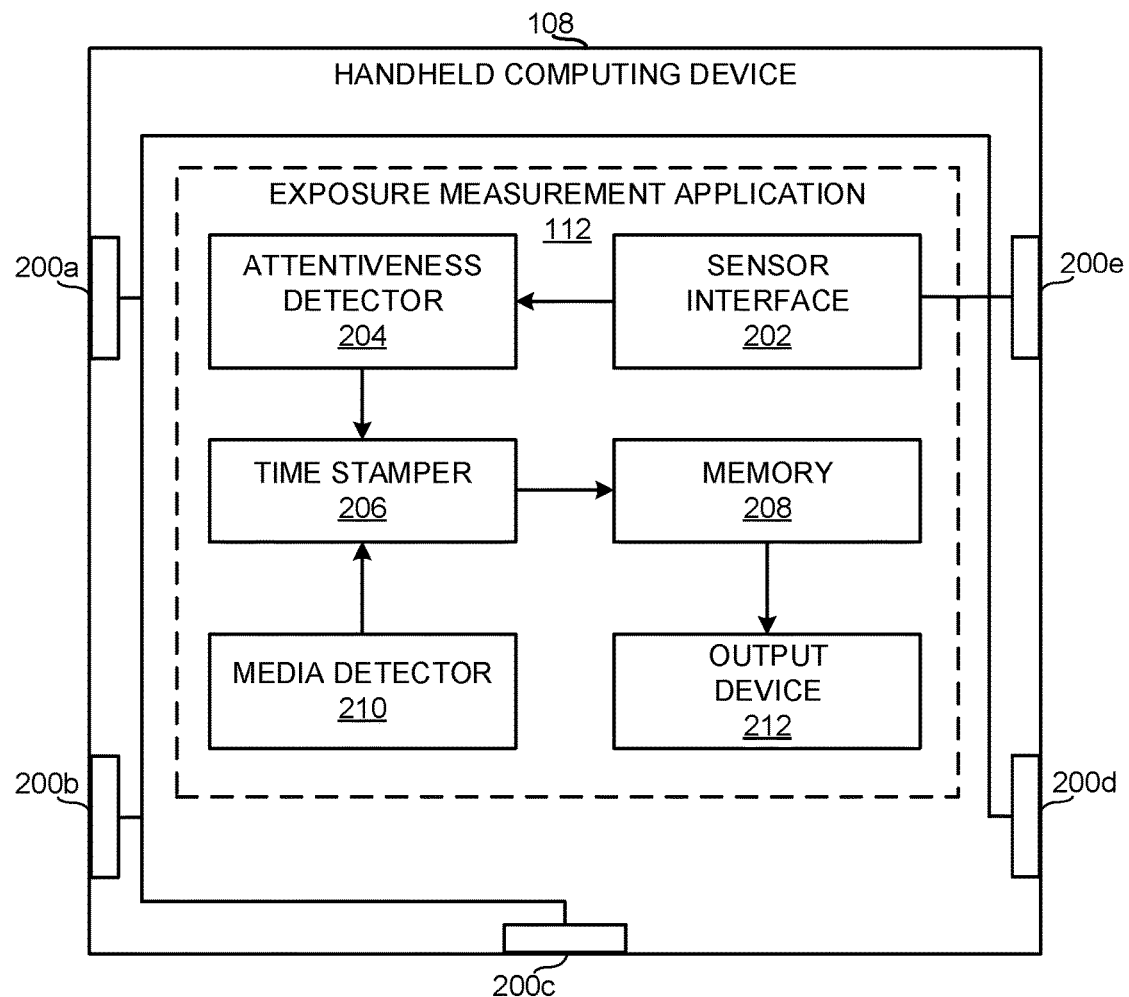
FIG. 2 is a block diagram of an example implementation of the example exposure measurement application of FIG. 1.

FIG. 2 is a block diagram of the example handheld computing device 108 of FIG. 1 including an example implementation of the example exposure measurement application 112 of FIG. 1. The example handheld computing device 108 of FIG. 2 includes a plurality of sensors 200*a-e* that include one or more of gravitational sensors (e.g., accelerometers, gyroscopes, tilt sensors), a microphone, and/or global positioning sensors. The sensors 200*a-e* collect data related to movements, tilts, orientations, paths of movement, etc. of the handheld computing device 108. For example, one or more of the sensors 200*a-e* may be a three-dimensional accelerometer capable of generating a chronological series of vectors indicative of directional magnitudes of movements taken by the example handheld device 108. In the illustrated example of FIG. 2, data collected by the sensors 200*a-e* is conveyed to a sensor interface 202 of the example exposure measurement application 112. The example sensor interface 202 of FIG. 2 interprets, formats, and/or conditions the data provided by the sensors 200*a-e* such that data collected by the sensors 200*a-e* is useable by the exposure measurement application 112. Thus, the example exposure measurement application 1122 of FIG. 2 uses data provided by the sensors 200*a-e* native to the handheld computing device 108 and, thus, does not require installation or coupling of non-native sensors to the handheld computing device 108. That is, the example exposure measurement application 112 of the illustrated example utilizes existing sensors 200*a-e* of the handheld computing device 108. In other examples, sensors are added to the monitored device.

To detect attentiveness of a current user of the handheld computing device 108 to a presentation of media on the handheld computing device 108, the example exposure measurement application 112 includes an attentiveness detector 204. The example attentiveness detector 204 of FIG. 2 receives sensor data from the sensor interface 202 related to tilts or orientations, tilt or orientation changes, positions relative to the user, changes in positions relative to the user, etc. experienced by the handheld computing device 108 when, for example, the handheld computing device 108 is presenting media (e.g., while one or more applications of the handheld computing device 108 are outputting media such as a movie, a song, an advertisement, etc.). As described in detail below in connection with FIGS. 3 and 4, the example attentiveness detector 204 compares the received sensor data to an engagement/disengagement likelihood index to determine likelihood(s) that the user is engaged with the media, beginning to engage the media, disengaged from the media, and/or beginning to disengage from the media.

The example attentiveness detector 204 of FIG. 2 outputs engagement/disengagement likelihood information to a time stamper 206. The time stamper 206 of the illustrated example includes a clock and a calendar. The example time stamper 206 of FIG. 2 associates a time and date with the engagement/disengagement information provided by the example attentiveness detector 204 by, for example, appending the time/date data to the end of the corresponding data. A data package including, for example, the engagement/disengagement information, a timestamp, a type or identifier associated with the handheld computing device 108, registration information associated with the household 100 and/or any of the members 102-106, etc. is stored in a memory 208. While shown as part of the example exposure measurement application 112 in FIG. 2, the memory 208 of the illustrated example is native to the monitored handheld computing device 108 and accessible to the example exposure measurement application 112. The memory 208 may include a volatile memory (e.g., Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The memory 210 may include one or more double data rate (DDR) memories, such as DDR, DDR2, DDR3, mobile DDR (mDDR), etc. The memory 208 may also include one or more mass storage devices such as, for example, hard drive disk(s), solid state memory, etc.

The example exposure measurement application 112 of FIG. 2 also includes a media detector 210 and an output device 212. The example media detector 210 of FIG. 2 detects presentation(s) of media (e.g., a song, a movie, a website, a game, etc.) on the handheld computing device 108 and collects media identifying information associated with the detected presentation(s). For example, the media detector 210 can identify a presentation time and a source of a presentation. The source identification data may be, for example, a universal resource locator (URL) associated with a web address that hosts a movie, a television program presented via an online service (e.g., Hulu®), a song, etc. The example media detector 210 can obtain the URL by, for example, monitoring a browser of the handheld computing device 108 and/or selection(s) made on the user interface 110 of the handheld computing device 108. Additionally or alternatively, the media detector 210 may utilize codes embedded and/or otherwise associated with media being presented on the handheld computing device 108 to identify the presentation(s). As used herein, a code is an identifier that is transmitted with the media for the purpose of identifying and/or for accessing the corresponding media. Codes may be carried in the audio, in the video, in metadata, in a program guide, or in any other portion of the media and/or the signal carrying the media. Additionally or alternatively, the media detector 210 can collect a signature representative of a portion of the media. As used herein, a signature is a representation of some characteristic of the media (e.g., a frequency spectrum of an audio signal). Signatures may be thought of as fingerprints of the media. Collected signature(s) can be compared against a collection of signatures of known media to identify the corresponding media. In some examples, the media detector 210 collects the signature(s). Additionally or alternatively, the media detector 210 can collect samples of the media and export the samples to a remote site for generation of the signature(s). Irrespective of the manner in which the media of the presentation is identified (e.g., based on browser monitoring, codes, metadata, and/or signatures), the media identification information is time stamped by the time stamper 206 and may be stored in the memory 208.

In some examples, the media detector 210 sends a signal to the attentiveness detector 204 in response to determining that the handheld computing device 108 is presenting media, thereby triggering the attentiveness detector 204 to collect user engagement/disengagement information. In such instances, the attentiveness detector 204 collects and interprets data from the sensors 200a-e while the handheld computing device 108 presents media such that the example attentiveness detector 204 determines whether, for example, a user is paying attention or beginning to pay attention to the handheld computing device 108 when media is being presented on the handheld computing device 108. In other words, the example engagement detector 204 of FIG. 2 cooperates with the media detector 210 to determine attentiveness of users to the handheld device 108 while media is being output.

In the illustrated example of FIG. 2, the output device 212 periodically and/or aperiodically exports the recorded data from the memory 208 to the data collection facility 114 of FIG. 1 via the network 116. The data collection facility 114 can analyze the data provided by the example exposure measurement application 112 in any suitable manner to, for example, develop statistics regarding exposure of the identified users and/or users having similar demographic(s) as the identified users. Alternatively, the data analysis could be performed locally and exported via the network 116 or the like to the data collection facility 114 for further processing. For example, user attentiveness information detected in connection with the handheld computing device 108 (e.g., by the attentiveness detector 204) at a time (e.g., as indicated by the time stamp appended to the user attentiveness information (e.g., by the time stamper 206) at which media (e.g., an advertisement) is detected (e.g., by the media detector 210) as presented on the handheld computing device 108 can be used in a exposure rating calculation for the corresponding media (e.g., the advertisement).

While an example manner of implementing the exposure measurement application 112 of FIG. 1 has been illustrated in FIG. 2, one or more of the elements, processes and/or devices illustrated in FIG. 2 may be combined, divided, re-arranged, omitted, eliminated and/or implemented in any other way. Further, the example sensor interface 202, the example attentiveness detector 204, the example time stamper 206, the example media detector 210, the example output device 212, and/or, more generally, the example exposure measurement application 112 of FIG. 2 may be implemented by hardware, software, firmware and/or any combination of hardware, software and/or firmware. Thus, for example, any of the example sensor interface 202, the example attentiveness detector 204, the example time stamper 206, the example media detector 210, the example output device 212, and/or, more generally, the example exposure measurement application 112 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. At least one of the example sensor interface 202, the example attentiveness detector 204, the example time stamper 206, the example media detector 210, the example output device 212, and/or, more generally, the example exposure measurement application 112 of FIG. 2 are hereby expressly defined to include a tangible computer readable medium such as a memory, DVD, CD, Blu-ray, etc. storing the software and/or firmware. Further still, the example exposure measurement application 112 of FIG. 2 may include one or more elements, processes and/or devices in addition to, or instead of, those illustrated in FIG. 2, and/or may include more than one of any or all of the illustrated elements, processes and devices.

Figure 3:
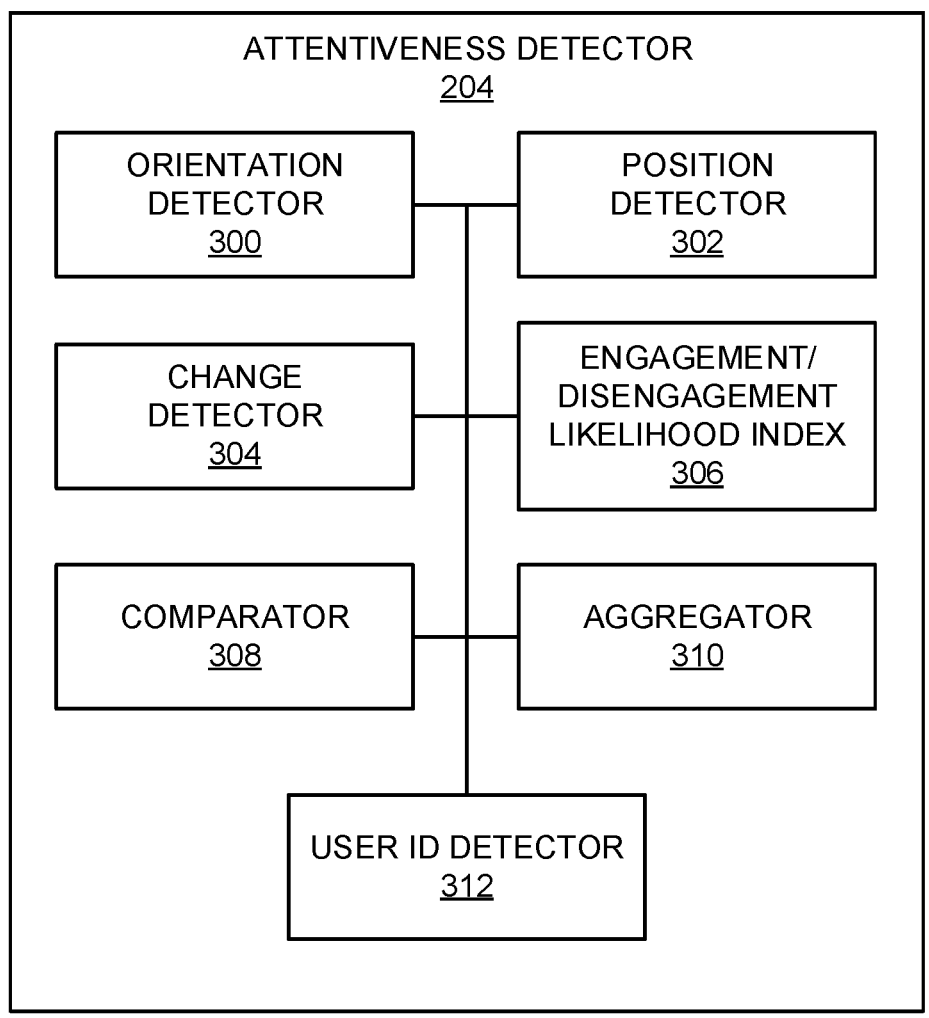
FIG. 3 is a block diagram of an example implementation of the example engagement detector of FIG. 2.

FIG. 3 is a block diagram of an example implementation of the example attentiveness detector 204 of FIG. 2. To determine an orientation of the example handheld computing device 108 of FIGS. 1 and/or 2, the example attentiveness detector 204 of FIG. 3 includes an orientation detector 300. In the illustrated example, the orientation detector 300 utilizes data received from the sensor interface 202 of FIG. 2. For example, the orientation detector 300 uses data from the sensors 200a-e that include, for example, accelerometer(s), magnetometer(s), tilt sensor(s), etc. to determine an angle at which the handheld computing device 108 is orientated relative to a horizontal reference line (e.g., on which one or more of the sensors 200a-e are based). Such an angle is referred to herein as a horizontal orientation. Thus, when the handheld computing device 108 is resting on a table, the example orientation detector 300 determines that the handheld computing device 108 is at a zero angle that corresponds to the horizontal reference line. In contrast, when the handheld computing device 108 is obtusely or acutely angled away from the horizontal reference line by an angular amount (e.g., forty-five degrees) while, for example, being held by a sitting user, the example orientation detector 300 determines that the handheld computing device 108 is being held at the detected angle.

Additionally or alternatively, the orientation detector 300 uses data from the sensors 200a-e to determine an angle at which the handheld computing device 108 is tilted or orientated relative to a second reference line, such as a vertical reference line, of which the sensors 200a-e are aware. Such an angle is referred to herein as a vertical orientation. The example orientation detector 300 analyzes the vertical orientation of the handheld computing device 108 by determining whether one side or edge of the handheld computing device 108 is higher than an opposing side or edge with reference to the vertical reference line. Thus, when the handheld computing device 108 is resting against a wall with one edge on a flat surface, the example orientation detector 300 determines that the handheld computing device 108 is at a zero tilt that corresponds to the vertical reference line. In contrast, when the handheld computing device 108 is obtusely or acutely angled away/toward the vertical reference line by an angular amount while, for example, being held by a user, the example orientation detector 300 determines that the handheld computing device 108 is being held at the detected tilt (e.g., thirty degrees).

To determine a position relative to a user and/or other objects, the example attentiveness detector 204 includes a position detector 302. In the illustrated example, the position detector 302 utilizes data received from the sensor interface 202 of FIG. 2. For example, the position detector 302 uses data from the sensors 200a-e that include, for example, proximity sensor(s), infrared sensor(s), temperature sensor(s), microphone(s), speaker(s), etc. to determine a position of the handheld computing device 108 relative to, for example, a body of a user. For example, the position detector 302 may determine that a measured temperature of a nearest object corresponds to a person or clothes being worn by a person. In such instances, the example position detector 302 measures a distance between the handheld computing device 108 and the nearest object using, for example, a proximity sensor and/or an infrared sensor. Additionally or alternatively, the position detector may determine that no object proximate the handheld computing device 108 corresponds to a person and, thus, that no person is near the handheld computing device 108.

In the illustrated example, the orientation detector 300 and the position detector 302 are triggered to collect and analyze data from the sensor interface 202 by, for example, the media detector 210 when the media detector 210 determines that the handheld computing device 108 is outputting media. Thus, in the illustrated example, the orientation detector 300 detects orientation(s) of the handheld computing device 108 when the handheld computing device 108 is presenting media and the position detector 302 detects a position of the handheld computing device 108 relative to a user when the handheld computing device 108 is presenting media to the user. In some examples, the example orientation detector 300 and/or the position detector 302 records a type of media being presented (e.g., as provided by the media detector 210 of FIG. 2) in association with the detected orientation(s) and/or relative position(s). Additionally or alternatively, the example orientation detector 300 and/or the example position detector 302 can analyze sensor data from the sensor interface 202 when the handheld computing device 108 is performing alternative operations and/or can continuously detect orientation(s) and/or relative position(s) regardless of an operating status of the handheld computing device 108.

The example attentiveness detector 204 of FIG. 3 includes a change detector 304 to detect changes (e.g., beyond a threshold magnitude) in orientation and/or relative position experienced by the handheld computing device 108. For example, the change detector 304 of FIG. 3 determines that the handheld computing device 108 experienced a change in orientation when an angle at which the handheld computing device 108 is orientated relative to a horizontal and/or vertical reference line changes from a first angle to a second angle different from the angle by a threshold magnitude (e.g., a number of degrees, such as one degree, two degrees, etc.). Further, the example change detector 304 of FIG. 3 determines that the handheld computing device 108 experienced a change in position relative to a user when a distance between the handheld computing device 108 and a user changes from a first distance to a second distance different from the first distance by a threshold magnitude (e.g., a number of centimeters, a number of inches, such as 1 centimeter, 1 inch, etc.).

When the example change detector 304 detects a change in orientation and/or position of the handheld computing device 108, the example change detector 304 records a first set of spatial conditions (e.g., a first orientation(s) and/or a first position relative to the user) associated with the handheld computing device 108 immediately prior to the detected change, as well as a second set of spatial conditions (e.g., second orientation(s) and/or a second relative position) associated with the handheld computing device 108 immediately after the detected change. Accordingly, with respect to a detected change in spatial condition(s) of the handheld computing device 108, the example change detector 304 of FIG. 3 records a starting set of spatial conditions (e.g., orientation(s) and/or a relative position) and an ending set of spatial conditions (e.g., orientation(s) and/or a relative position).

The example attentiveness detector 204 of FIG. 3 includes an engagement/disengagement likelihood index 306 that includes a plurality of predefined spatial condition changes related to the handheld computing device 108. The predefined spatial condition changes of the example likelihood index 306 of FIG. 3 may be set and updated by, for example, administrators of programmers associated with the example exposure measurement application 112 of FIGS. 1 and/or 2 and/or the example data collection facility 114 of FIG. 1. The predefined spatial condition changes of the example likelihood index 306 of FIG. 3 include, for example, a first orientation change from a first starting orientation to a first ending orientation, a second orientation change from the first starting orientation to a second ending orientation, a third orientation change from the first starting orientation to a third ending orientation, a fourth orientation change from a second starting orientation to the first ending orientation, a fifth orientation change from the second starting orientation to the second ending orientation, a sixth orientation change from the second starting orientation to the third ending orientation, etc. Further, the predefined spatial condition changes of the example likelihood index 306 of FIG. 3 include, for example, a first position change from a first starting relative position to a first ending relative position, a second position change from the first starting relative position to a second ending relative position, a third position change from the first starting relative position to a third ending relative position, a fourth position change from a second starting relative position to the first ending relative position, a fifth position change from the second starting relative position to the second ending relative position, a sixth position change from the second starting relative position to the third ending relative position, etc. Further, the predefined spatial condition changes of the example likelihood index 306 include, for example, the first orientation change from above coinciding with the first position change from above, the first orientation change from above coinciding with the second position change from above, the second orientation change from above coinciding with the third position change from above, etc.

Some of the predefined spatial condition changes of the example index 306 are associated with an engagement likelihood, which reflects how likely the respective change corresponds to a user being engaged with or beginning to engage the handheld computing device 108. Additionally or alternatively, some of the predefined spatial condition changes of the example index 306 are associated with a disengagement likelihood, which reflects how likely the respective change corresponds to the user being disengaged or beginning to disengage from the handheld computing device 108.

As described above, the example exposure measurement application 112 of FIGS. 1 and/or 2 is made available to different types of handheld computing devices (e.g., tablets, smart phones, laptops, etc.), as well as different specific brands or models of handheld computing devices. Accordingly, different versions of the example likelihood index 308 are made available (e.g., via download from an online application store). In some examples, the type or model of a handheld computing device 108 is automatically detected (e.g., upon installation and/or download of the exposure measurement application 112) and a corresponding version of the likelihood index 308 is installed and used by the example attentiveness detector 204. The different versions of the likelihood index 308 are tailored to the corresponding types or models of the handheld devices because different types or models of handheld devices are designed to be handled differently and/or have different characteristics that cause users to handle the devices differently while interacting (e.g., playing a game, viewing media, etc.) with the devices. For example, a larger screen size of a first type of handheld computing device compared to a second handheld computing device may enable a user of the first type of handheld computing device to view the screen at a wider angle than the second type of handheld computing device. Additional or alternatively, some handheld computing devices are designed to receive different types of motion related input (e.g., shaking, alteration of orientation to change viewing mode, etc.) than others. As a result, certain motions, orientations, changes to relative position may correspond to a first interaction for a first type of handheld computing device and a second interaction for a second type of handheld computing device. Other differences between handheld computing devices may be taken into consideration for the tailoring of the likelihood index 308 for different devices. For example, the thresholds associated with the corresponding likelihood index 308 for the particular types of handheld computing devices are customized for the particular characteristic(s) and/or user input configuration(s).

As described above, for each detected change in a spatial condition (e.g., an orientation or a relative position) above a threshold, the example change detector 304 records a starting spatial condition and an ending spatial condition. The example attentiveness detector 204 of FIG. 3 includes a comparator 308 to compare the recorded starting and ending spatial conditions associated with detected changes to the entries of the engagement/disengagement likelihood index 306. In other words, the example comparator 308 uses recorded spatial conditions associated with a detected change to query the likelihood index 306. Thus, the example comparator 308 determines whether the detected change corresponds to any of the predefined spatial condition changes of the likelihood index 306. In the illustrated example, the comparator 308 determines whether the detected change matches any of the predefined spatial condition changes of the example index 306 within a threshold or tolerance (e.g., sufficiently similar). If so, the corresponding likelihood(s) of the index 306 are applied to the detected change.

Because the detected spatial condition change may include more than one aspect, the example comparator 308 may find more than one match in the likelihood index 306. For example, suppose the change detector 304 detects a change involving a first spatial condition change from a first horizontal orientation to a second horizontal orientation, as well as a second spatial condition change from a first vertical horizontal orientation to a second horizontal orientation, as well as a third spatial change from a first relative position to a second relative position. In such an instance, the example comparator 308 may find matches in the index 306 for the first and second spatial condition changes. Additionally or alternatively, the example comparator 308 may find a match in the index 306 for a combination or concurrence of the first and second spatial condition changes or match for a combination or concurrence of the second and third spatial condition changes. As a result, more than one likelihood from the index 306 may apply to the detected change. For such instances, the example attentiveness detector 204 includes an aggregator 310 to aggregate the plurality of likelihoods when a detected change involves more than one matching spatial condition change from the index 306. In the illustrated example of FIG. 3, the aggregator 310 averages the likelihoods. However, additional or alternative mathematical operations and/or algorithms (e.g., calculations) may be employed by the example aggregator 310 of FIG. 3.

In some examples, the plurality of likelihoods are output individually as separate measurements of user attentiveness (e.g., without being aggregated). For example, when a first one of the likelihoods corresponds to an engagement likelihood and a second one of the likelihoods corresponds to a disengagement likelihood, the comparator 308 of such examples outputs the two likelihoods individually without aggregator the first and second likelihoods.

In the illustrated example, when a single match is found in the likelihood index 306 for a detected change, the example comparator 308 outputs the corresponding likelihood as representative of likely engagement (or disengagement) of the current user with a presentation of the handheld computing device 108. Otherwise, in the illustrated example, when more than one match is found in the likelihood index 306 for a detected change, the example aggregator 310 outputs the aggregated likelihood as representative of likely engagement (or outputs the aggregated likelihood as representative of likely disengagement) of the current user with a presentation of the handheld computing device 108.

The example attentiveness detector 204 of FIG. 3 also includes a user identifier (ID) requestor 312 to request user identification information from the current user in response to, for example, the change detector 304 determining that that handheld computing device 108 is experiencing and/or experienced a spatial condition change and/or the comparator 308 or aggregator outputting a likelihood of engagement or disengagement suggesting a change in attentiveness. In the illustrated example, the user ID requestor 310 generates a prompt on the user interface 110 that requests user identification information from the user such that the exposure measurement application 112 can attribute the detected user attentiveness to a particular one of, for example, the household members 102-106.

While an example manner of implementing the attentiveness detector 204 of FIG. 2 has been illustrated in FIG. 3, one or more of the elements, processes and/or devices illustrated in FIG. 3 may be combined, divided, re-arranged, omitted, eliminated and/or implemented in any other way. Further, the example orientation detector 300, the example position detector 302, the example change detector 304, the example engagement/disengagement likelihood index 306, the example comparator 308, the example aggregator 310, the example user ID requester 312, and/or, more generally, the example attentiveness detector 204 of FIG. 3 may be implemented by hardware, software, firmware and/or any combination of hardware, software and/or firmware. Thus, for example, any of the example orientation detector 300, the example position detector 302, the example change detector 304, the example engagement/disengagement likelihood index 306, the example comparator 308, the example aggregator 310, the example user ID requester 312, and/or, more generally, the example attentiveness detector 204 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), field programmable gate array (FPGA), etc. At least one of the example orientation detector 300, the example position detector 302, the example change detector 304, the example engagement/disengagement likelihood index 306, the example comparator 308, the example aggregator 310, the example user ID requester 312, and/or, more generally, the example attentiveness detector 204 of FIG. 3 are hereby expressly defined to include a tangible computer readable medium such as a memory, DVD, CD, Bluray, etc. storing the software and/or firmware. Further still, the example attentiveness detector 204 of FIG. 3 may include one or more elements, processes and/or devices in addition to, or instead of, those illustrated in FIG. 3, and/or may include more than one of any or all of the illustrated elements, processes and devices.

Figure 4:
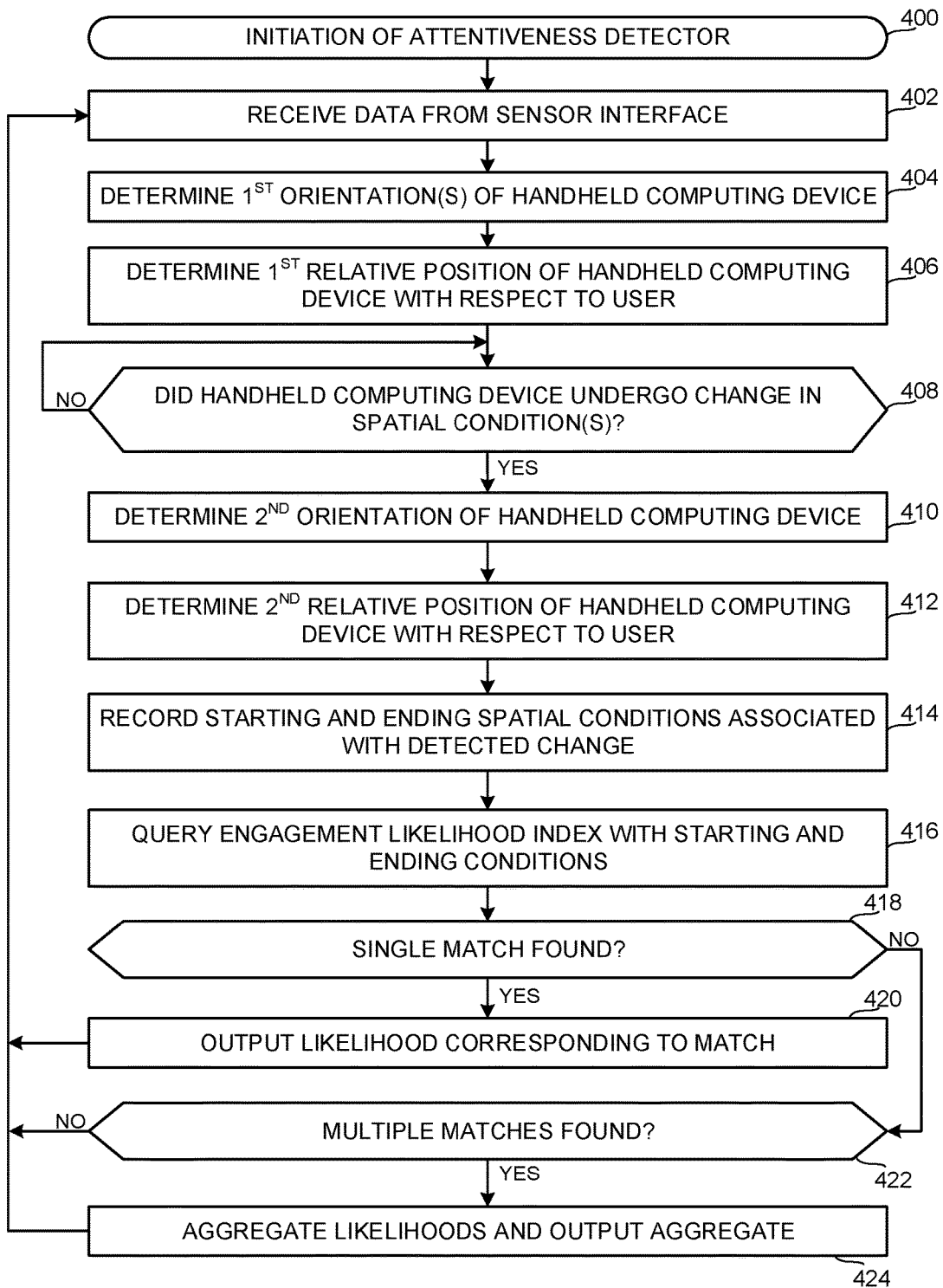
FIG. 4 is a flowchart representative of example machine readable instructions that may be executed to implement the example exposure measurement application of FIGS. 1, 2 and/or 3.

A flowchart representative of example machine readable instructions for implementing the example exposure measurement application 112 of FIGS. 1, 2 and/or 3 is shown in FIG. 4. In the example of FIG. 4, the machine readable instructions comprise a program for execution by a processor such as the processor 512 shown in the example computer 500 discussed below in connection with FIG. 5. The program may be embodied in software stored on a tangible computer readable medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example programs are described with reference to the flowchart illustrated in FIG. 4, many other methods of implementing the example exposure measurement application 112 may alternatively be used. For example, the order of execution of the blocks may be changed, and/or some of the blocks described may be changed, eliminated, or combined.

As mentioned above, the example processes of FIG. 4 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example processes of FIG. 4 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 4 begins with an initiation of the example attentiveness detector 204 of FIGS. 2 and/or 3 (block 400). In the example of FIG. 4, the attentiveness detector 204 is initiated when the example exposure measurement application 112 of FIGS. 1 and/or 2 is downloaded and/or installed on the handheld computing device 108 of FIGS. 1 and/or 2. For example, the first member 102 of the household 100 of FIG. 1 may download the exposure measurement application 112 via an online application service (e.g., iTunes®) as an application designed for tablets and/or smart phones. As described above, the installation of the example exposure measurement application 112 onto the handheld computing device 108 sometimes includes determination of a type (e.g., tablet, smart phone, laptop, brand, model, etc.) of the handheld computing device 108) and installing the corresponding version of the engagement/disengagement likelihood index 306.

After installation, the exposure measurement application 112 runs in the background (e.g., does not require manual instantiation) and the example sensor interface 202 of FIG. 2 conveys data to the example attentiveness detector 204 including information related to one or more spatial conditions of the handheld computing device 108 (block 402). Based on the information provided by the sensor interface 202, the example orientation detector 300 determines one or more orientations of the handheld computing device 108 (block 404). For example, the orientation detector 300 detects a horizontal orientation of the handheld computing device 108 and a vertical orientation of the handheld computing device 108. Also based on the information provided by the sensor interface 202, the example position detector 302 determines a position of the handheld computing device 108 relative to, for example, a current user (block 406). In some instances, the position detector 302 determines that the handheld computing device 108 is at a certain distance away from the user. Alternatively, in some instances, the example position detector 302 determines that the handheld computing device 108 is not within a detectable distance of a user.

The example detector 304 determines whether the handheld computing device 108 has experienced one or more spatial condition changes from the orientation(s) and/or relative position determined at blocks 404 and 406, respectively (block 408). When the example change detector 304 detects such sufficient a change (e.g., a change greater than a threshold such as one percent), the change detector 304 instructs the orientation detector 300 and the position detector 302 to determine the new spatial conditions (e.g., orientation(s) and/or relative position) of the handheld computing device 108. In response, the orientation detector 300 uses data from the sensor interface 202 to determine the orientation(s) of the handheld computing device 108 (block 410). Further, the position detector 302 uses data from the sensor interface 202 to determine the relative position of handheld computing device 108 (block 412). The example change detector 304 records the orientation(s) and the relative position determined at blocks 404 and 406, respectively, as starting spatial conditions for the detected change (block 414). Further, the example change detector 304 records the orientation(s) and the relative position determined at blocks 410 and 412, respectively, as the sending spatial conditions for the detected change (block 414).

The example comparator 308 uses the starting and ending spatial conditions associated with the detected change to query the example engagement/disengagement index 306 to determine whether the starting and ending spatial conditions match any of the spatial condition changes stored in the index 306 (block 416). If a single match is found in the index (block 418), the comparator 308 outputs the likelihood of the index 306 corresponding to the match as a measure of attentiveness (e.g., engagement or disengagement) of a user of the handheld computing device 108 (block 420). Control then returns to block 402. Otherwise, if more than one match is found in the index 306 (block 422), the aggregator 310 aggregates (e.g., averages) the likelihoods of the index 306 corresponding to the matches and outputs the aggregated likelihood as a measure of attentiveness (e.g., engagement or disengagement) of a user of the handheld computing device 108 (block 424). Control returns to block 402.

Figure 5:
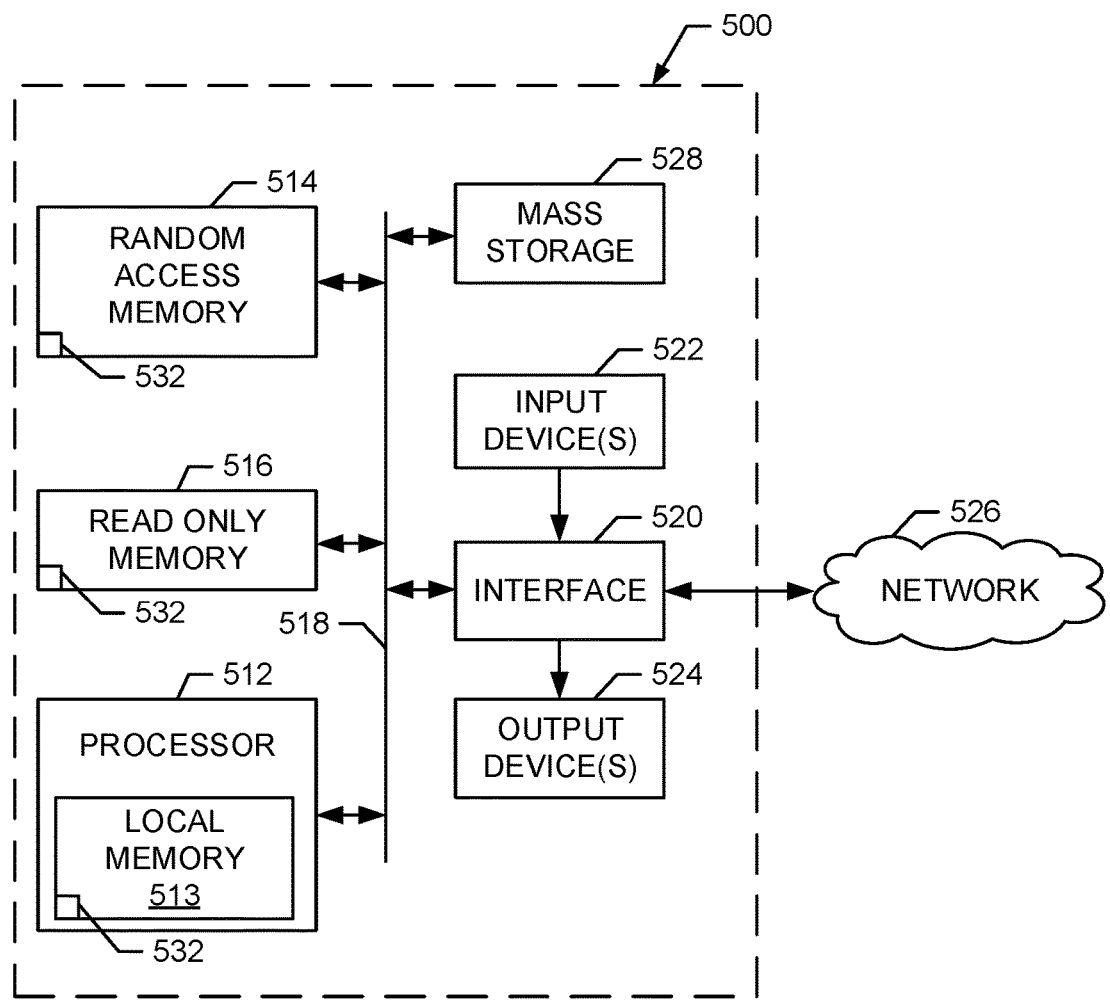
FIG. 5 is a block diagram of an example processing platform capable of executing the example machine readable instructions of FIG. 4 to implement the example exposure measurement application of FIGS. 1, 2 and/or 3.

FIG. 5 is a block diagram of an example processor platform 500 capable of executing the instructions of FIGS. 4 to implement the attentiveness detector 204 of FIGS. 2 and/or 3. The processor platform 500 can be, for example, a mobile phone (e.g., a cell phone), a personal digital assistant (PDA), a tablet, a laptop computer, a handheld gaming device, or any other type of handheld computing device.

The processor platform 500 of the instant example includes a processor 512. For example, the processor 512 can be implemented by one or more microprocessors or controllers from any desired family or manufacturer.

The processor 512 is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 also includes an interface circuit 520. The interface circuit 520 may be implemented by any type of interface standard, such as an Ethernet interface, a universal serial bus (USB), and/or a PCI express interface.

One or more input devices 522 can be connected to the interface circuit 520. The input device(s) 522 permit a user to enter data and commands into the processor 512. The input device(s) can be implemented by, for example, a keyboard, a mouse, a touchscreen, a track-pad, a trackball, isopoint and/or a voice recognition system.

One or more output devices 524 can be connected to the interface circuit 520. The output devices 524 can be implemented, for example, by display devices (e.g., a liquid crystal display, a touchscreen, and/or speakers). The interface circuit 520, thus, typically includes a graphics driver card.

The interface circuit 520 also includes a communication device such as an antenna, a modem or network interface card to facilitate exchange of data with external computers via a network 526 (e.g., a WiFi network, an Ethernet connection, a digital subscriber line (DSL), a telephone line, coaxial cable, a cellular system, etc.).

The processor platform 500 also includes one or more mass storage devices 528, such as a hard drive for storing software and data. The mass storage device 528 may implement the memory 208 of FIG. 2.

The coded instructions 532 of FIGS. 4 may be stored in the mass storage device 528, in the volatile memory 514, and/or in the non-volatile memory 516.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method, comprising:
based on data from at least one of an orientation sensor or a position sensor in a handheld computing device, determining, by executing an instruction with a processor, at least one of:
a first orientation change of the handheld computing device from a first starting orientation to a first ending orientation based on the data, the first starting orientation and the first ending orientation being angular orientations relative to a first reference orientation as determined by an orientation detector; or
a first position change of the handheld computing device from a first starting position to a first ending position based on the data, the first starting position and the first ending position being positions relative to a user; and
comparing, by executing an instruction with the processor, at least one of the first orientation change or the first position change to a plurality of spatial condition change combinations associated with respective likelihoods indicative of user attentiveness related to the handheld computing device to determine user attentiveness to a presentation on the handheld computing device, the plurality of spatial condition change combinations including a plurality of orientation changes from respective starting orientations to respective ending orientations and a plurality of position changes from respective starting positions to respective ending positions.

2. The method as defined in claim 1, wherein the first starting position and the first ending position correspond to respective distances between the handheld computing device and the user.

3. The method as defined in claim 1, wherein the first reference orientation is at least one of a horizontal orientation or a vertical orientation.

4. The method as defined in claim 1, wherein the user attentiveness represents how likely the first orientation change, the first position change, or a combination of the first orientation change and the first position change corresponds to the user paying attention to the presentation on the handheld computing device.

5. The method as defined in claim 1, wherein the user attentiveness represents how likely the first orientation change, the first position change, or a combination of the first orientation change and the first position change corresponds to the user beginning to pay attention to the presentation on the handheld computing device.

6. The method as defined in claim 1, wherein the user attentiveness represents how likely the first orientation change, the first position change, or a combination of the first orientation change and the first position change corresponds to the user not paying attention to the presentation on the handheld computing device.

7. The method as defined in claim 1, wherein the user attentiveness represents how likely the first orientation change, the first position change, or a combination of the first orientation change and the first position change corresponds to the user beginning to not pay attention to the presentation on the handheld computing device.

8. A tangible computer readable storage medium comprising instructions that, when executed, cause a processor to at least:
based on data from at least one of an orientation sensor or a position sensor in a handheld computing device, determine at least one of:
a first orientation change of the handheld computing device from a first starting orientation to a first ending orientation based on the data, the first starting orientation and the first ending orientation being angular orientations relative to a reference position orientation; or
a first position change of the handheld computing device from a first starting position to a first ending position based on the data, the first starting position and the first ending positions being distances between the handheld computing device and a user; and
compare at least one of the first orientation change or the first position change to a plurality of spatial condition change combinations associated with respective likelihoods indicative of user attentiveness related to the handheld computing device to determine user attentiveness to a presentation on the handheld computing device, the plurality of spatial condition change combinations including a plurality of orientation changes from respective starting orientations to respective ending orientations and a plurality of position changes from respective starting positions to respective ending positions.

9. The computer readable storage medium as defined in claim 8, wherein the first starting orientation and the first ending orientation are at least one of a horizontal orientation or a vertical orientation.

10. The computer readable storage medium as defined in claim 8, wherein the user attentiveness represents how likely the first orientation change, the first position change, or a combination of the first orientation change and the first position change corresponds to the user paying attention to the presentation on the handheld computing device.

11. The computer readable storage medium as defined in claim 8, wherein the user attentiveness represents how likely the first orientation change, the first position change, or a combination of the first orientation change and the first position change corresponds to the user beginning to pay attention to the presentation on the handheld computing device.

12. The computer readable storage medium as defined in claim 8, wherein the user attentiveness represents how likely the first orientation change, the first position change, or a combination of the first orientation change and the first position change corresponds to the user not paying attention to the presentation on the handheld computing device.

13. The computer readable storage medium as defined in claim 8, wherein the user attentiveness represents how likely the first orientation change, the first position change, or a combination of the first orientation change and the first position change corresponds to the user beginning to not pay attention to the presentation on the handheld computing device.

14. A handheld computing device, comprising:
a detector to detect at least one of a first orientation change of the handheld computing device or a first position change between the handheld computing device and a user based on data from at least one of an orientation sensor or a position sensor of the handheld computing device; and
a comparator to compare at least one of the first orientation change or the first position change to a plurality of spatial condition change combinations associated with respective likelihoods indicative of user attentiveness related to the handheld computing device to determine user attentiveness to a presentation on the handheld computing device, the plurality of spatial condition change combinations including a plurality of orientation changes from respective starting orientations to respective ending orientations and a plurality of position changes from respective starting positions to respective ending positions.

15. The apparatus as defined in claim 14, wherein the first orientation change is a horizontal orientation change or a vertical orientation change relative to a reference orientation.

16. The apparatus as defined in claim 14, wherein the user attentiveness represents how likely the first orientation change, the first position change, or a combination of the first orientation change and the first position change corresponds to the user paying attention to the presentation on the handheld computing device.

17. The apparatus as defined in claim 14, wherein the user attentiveness represents how likely the first orientation change, the first position change, or a combination of the first orientation change and the first position change corresponds to the user beginning to pay attention to the presentation on the handheld computing device.

18. The apparatus as defined in claim 14, wherein the user attentiveness represents how likely the first orientation change, the first position change, or a combination of the first orientation change and the first position change corresponds to the user not paying attention to the presentation on the handheld computing device.

19. The apparatus as defined in claim 14, wherein the user attentiveness represents how likely the first orientation change, the first position change, or a combination of the first orientation change and the first position change corresponds to the user beginning to not pay attention to the presentation on the handheld computing device.

20. The apparatus as defined in claim 14, wherein the detector is to detect the first orientation change and the first position change, and the comparator is to determine the user attentiveness based on the first orientation change and the first position change.

* * * * *